(12) United States Patent
Wang et al.

(10) Patent No.: US 12,168,491 B2
(45) Date of Patent: Dec. 17, 2024

(54) METHOD FOR MANUFACTURING STEERING DEVICE

(71) Applicant: HITACHI ASTEMO, LTD., Hitachinaka (JP)

(72) Inventors: Qixiang Wang, Hitachinaka (JP); Osamu Yoshida, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 144 days.

(21) Appl. No.: 17/799,235

(22) PCT Filed: Feb. 3, 2021

(86) PCT No.: PCT/JP2021/003911
§ 371 (c)(1),
(2) Date: Aug. 11, 2022

(87) PCT Pub. No.: WO2021/161869
PCT Pub. Date: Aug. 19, 2021

(65) Prior Publication Data
US 2023/0069250 A1 Mar. 2, 2023

(30) Foreign Application Priority Data
Feb. 13, 2020 (JP) .................................. 2020-022092

(51) Int. Cl.
*B62D 65/02* (2006.01)
*B62D 3/12* (2006.01)
(Continued)

(52) U.S. Cl.
CPC ............. *B62D 65/02* (2013.01); *B62D 3/126* (2013.01); *F16B 39/02* (2013.01); *B62D 5/0442* (2013.01)

(58) Field of Classification Search
CPC ........ B62D 65/02; B62D 3/126; B62D 3/123; B62D 5/0442; F16B 39/02; F16H 55/283; F16H 19/04
See application file for complete search history.

(56) References Cited

U.S. PATENT DOCUMENTS

2012/0216642 A1* 8/2012 Strian ..................... B62D 3/126
420/104

FOREIGN PATENT DOCUMENTS

JP 2013199158 A * 10/2013
JP 2017013648 A * 1/2017

OTHER PUBLICATIONS

Yoshida et al.; JP2013199158A; Method for Fixing Adjusting Screw of Steering Device, and Steering Device; EPO English Machine Translation, pp. 1-7 (Year: 2012).*

(Continued)

*Primary Examiner* — Bayan Salone
(74) *Attorney, Agent, or Firm* — FOLEY & LARDNER LLP

(57) ABSTRACT

A cylindrical part of a rack retainer accommodation part and an adjust screw are caulked such that a plastic deformation region by caulking straddles both a female screw part of the cylindrical part and a male screw part of the adjust screw, and the adjust screw is loosened to a point where a set load that is a force by which the rack retainer urges a rack bar falls within a predetermined range. After the set load adjusting step, the caulking step is not performed again, and fluctuations in the set load associated with the impact of caulking work after the set load adjusting step can be suppressed. Thus, it is possible to suppress fluctuations in the urging force of the rack retainer applied to the rack bar caused by caulking work which stops the rotation between the rack retainer accommodation part and the adjust screw.

17 Claims, 6 Drawing Sheets

(51) Int. Cl.
*B62D 5/04* (2006.01)
*F16B 39/02* (2006.01)

(56) References Cited

OTHER PUBLICATIONS

International Search Report dated Apr. 13, 2021 issued in International Application No. PCT/JP2021/003911, with English translation, 5 pages.
Written Opinion of the International Searching Authority dated Apr. 13, 2021 issued in International Application No. PCT/JP2021/003911, with English translation, 13 pages.

* cited by examiner

US 12,168,491 B2

METHOD FOR MANUFACTURING STEERING DEVICE

TECHNICAL FIELD

The present invention relates to a method for manufacturing a steering device, and particularly relates to a method for manufacturing a steering device equipped with a drive mechanism for driving a rack bar by a pinion shaft.

BACKGROUND TECHNOLOGY

As a steering device used for steering a vehicle such as an automobile, for example, one described in the following patent document 1 has been known.

The steering device described in the patent document 1 is provided with a pinion shaft to which the rotation of a steering wheel is transmitted, a rack bar which meshes with the pinion shaft, a rack retainer for supporting the back side of the rack bar, and a compression spring (urging member) for urging the rack bar toward the pinion shaft side via the rack retainer. Then, the urging force (set load) of the compression spring is adjusted by an adjust screw.

In addition, the above-mentioned steering device of the patent document 1 is an ordinary steering device which is not provided with an electric motor for assisting a steering force. However, a power steering device having a function for assisting a steering force by using an electric motor is also provided with a driving mechanism having the same configuration of a driving mechanism for applying a steering auxiliary force to the pinion shaft by transmitting the rotation of the electric motor.

PRIOR ART DOCUMENT

Patent Document

Patent Document 1: Japanese Patent Application Publication 2017-13648

SUMMARY OF THE INVENTION

Problem(s) to be Solved by the Invention

Here, when the urging force of the rack retainer is adjusted by the adjust screw, it is necessary to hold this urging force. Consequently, in general, by caulking between the adjust screw and a cylindrical part which accommodates the rack retainer located adjacent to the adjust screw by caulking work carried out by using a caulking tool such as a punch, the rotation of the adjust screw is suppressed.

However, since the caulking work is carried out after adjustment work by the adjust screw, an external mechanical force (impact force) is applied in the axial direction of the adjust screw caused by the caulking work. Consequently, fluctuations in the urging force set by the adjust screw occur.

For example, when the urging force by the adjust screw fluctuates and becomes large due to the caulking work, the rack bar is strongly pressed to the pinion shaft by the rack retainer, and the motion transmission between the rack bar and the pinion is hardly performed, as a result of which the contact part between the rack bar and the pinion is early worn. Therefore, a steering device has been required which is capable of suppressing fluctuations in the urging force of the rack retainer applied to the rack bar caused by the caulking work which stops the rotation.

An object of the present invention is to provide a method for manufacturing a steering device which is capable of suppressing fluctuations in the urging force of the rack retainer applied to the rack bar caused by the caulking work which stops the rotation between a rack retainer accommodation part and the adjust screw.

Means for Solving the Problem(s)

The present invention is a method for manufacturing a steering device provided with: a gear housing including a pinion shaft accommodation part, a rack bar accommodation part and a rack retainer accommodation part; a pinion shaft which is accommodated in the pinion shaft accommodation part, has a pinion tooth, and rotates integrally with a rack bar; the rack bar which rotates with a rotation of a steering wheel, is accommodated in the rack bar accommodation part, and has a rack tooth meshing with the pinion tooth; a rack retainer accommodated in the rack retainer accommodation part; an adjust screw provided in the rack retainer accommodation part; and an urging member accommodated in the rack retainer accommodation part so as to be arranged between the rack retainer and the adjust screw, wherein the rack retainer accommodation part includes a cylindrical part, a female screw part formed on an inner peripheral side of the cylindrical part and a taper part provided at an inner peripheral edge portion of the cylindrical part of an outer side end portion of a pair of end portions of the cylindrical part, the outer side end portion being located away from the rack bar accommodation part, and wherein the adjust screw includes an adjust screw main body part and a male screw part provided on an outer peripheral side of the adjust screw main body part and screwed with the female screw part, the method comprising: a pinion shaft assembly step of assembling the pinion shaft to the pinion shaft accommodation part; a rack bar assembly step of assembling the rack bar to the rack bar accommodation part; a rack retainer assembly step of assembling the rack retainer to the rack retainer accommodation part, the rack retainer being provided such that the rack bar is interposed between the pinion shaft and the rack retainer; an urging member assembly step of assembling the urging member to the rack retainer accommodation part so as to be positioned on an opposite side of the rack bar with respect to the rack retainer; an adjust screw screwing-in step of screwing in the adjust screw in the rack retainer accommodation part such that the male screw part of the adjust screw is screwed with the female screw part of the rack retainer accommodation part and the urging member is compressed; a caulking step of caulking and fixing the adjust screw and the rack retainer accommodation part such that a plastic deformation region by caulking straddles both of the female screw part and the male screw part, the caulking step being carried out after the adjust screw screwing-in step; and a set load adjusting step of adjusting a set load, which is a force by which the rack retainer urges the rack bar, by loosening the adjust screw to reduce a screwing-in amount of the adjust screw to a point where the set load falls within a predetermined range, the set load adjusting step being carried out after the caulking step.

Effect of the Invention

According to the present invention, by the caulking step, the region straddling both of the female screw part and the male screw part is plastically deformed, and, consequently, the backlash between the cylindrical part and the adjust screw decreases. After that, by carrying out the set load adjusting step, it is possible to suppress fluctuations in the set load caused by the fluctuation of the screwing-in amount of the adjust screw after the set load adjusting step.

In addition, after the set load adjusting step, the caulking step is not carried out again, and thereby it is possible to suppress fluctuations in the set load associated with the impact of caulking work after the set load adjusting step. Moreover, since the caulking step is carried out such that the region straddling both of the female screw part and the male screw part is plastically deformed, the fixing strength of the female screw part and the male screw part in the plastic deformation region can be improved, and thereby it is possible to surely suppress fluctuations in the set load after the set load is adjusted.

MODE FOR IMPLEMENTING THE INVENTION

In the following, although an embodiment of the present invention will be explained in detail by referencing the drawings, the present invention is not limited to the following embodiment, and various variations and applications are also included within the scope of the technical concept of the present invention. In addition, the embodiment shown below shows an example of an electric power steering device.

First, the configuration of an electric power steering device to which the present invention is applied will be explained by referencing FIG. 1 and FIG. 2.

Figure 1:
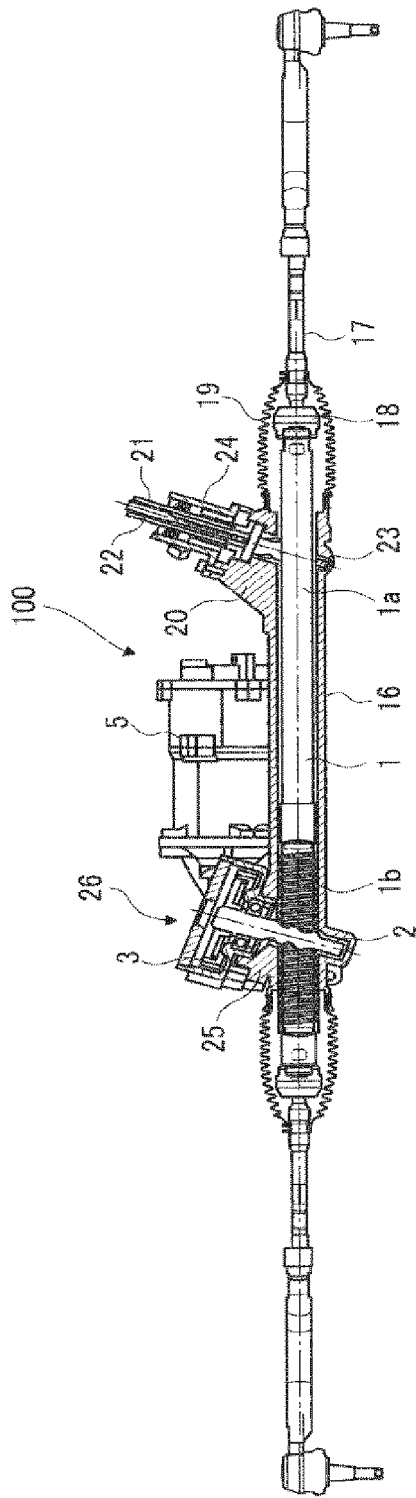
FIG. 1 is a front view when a power steering device is viewed from the vehicle front side.

FIG. 1 is a drawing showing the whole configuration of an electric power steering device 100. As shown in FIG. 1, the electric power steering device 100 includes a rack housing 16 extending in the right and left directions of a vehicle, and a rack bar (steering shaft) 1 is accommodated in the rack housing 16 so as to be slidable in the right and left directions of the vehicle (automobile).

The end portions of the rack bar 1 protrude from the respective both end opening portions of the rack housing 16, and tie rods 17 are connected to the respective these end portions via joints 18. The end portions of the rack bar 1, the joints 18 and the arears near the end portions on the joint 18 side of the tie rods 17 are covered with boots 19. The tie rods 17 are moved by the movement of the rack bar 1, and steered wheels are steered via a steering mechanism connected to the tie rods 17.

A steering-side gear housing 20 is provided on one end side (right side in FIG. 1) of the rack housing 16. An input shaft 21 connected to a steering wheel is axially supported on the steering-side gear housing 20 so as to be rotatable. The input shaft 21 is connected to a first pinion shaft 23 via a torsion bar 22 so as to be relatively rotatable.

A torque sensor 24 is provided on the outer peripheral side of the input shaft 21. The torque sensor 24 is configured to detect steering torque input to the steering wheel by a driver based on the relative rotation amount of the input shaft 21 and the first pinion shaft 23. The first pinion shaft 23 meshes with a first rack tooth 1a formed on one end side of the rack bar 1 so as to transmit the steering torque input to the steering wheel to the rack bar 1.

A motor-side gear housing 25 is provided on the other end side (left side in FIG. 1) of the rack housing 16. The motor-side gear housing 25 accommodates a power steering mechanism 26 which outputs auxiliary steering torque to the steering torque input to the steering wheel by a driver.

The power steering mechanism 26 includes an electric motor 5, a worm shaft 4 (see FIG. 2) connected to the output shaft of the electric motor 5, a worm wheel 3 (see FIG. 2) meshing with the worm shaft 4, and a second pinion shaft 2 which rotates integrally with the worm wheel 3.

The second pinion shaft 2 meshes with a second rack tooth 1b formed on the other end side of the rack bar 1, so as to transmit the motor torque input from the electric motor 5 to the rack bar 1. The power steering mechanism 26 is composed of a first housing 6 (see FIG. 2) and a second housing 7 (see FIG. 2), and the second pinion shaft 2 and the like are assembled thereto.

By the first housing 6 and the second housing 7, the motor-side gear housing 25 is formed which includes a pinion shaft accommodation part accommodating the second pinion shaft 2, a rack bar accommodation part accommodating part of the rack bar 1 and a rack retainer accommodation part accommodating the after-mentioned rack retainer 11.

Figure 2:
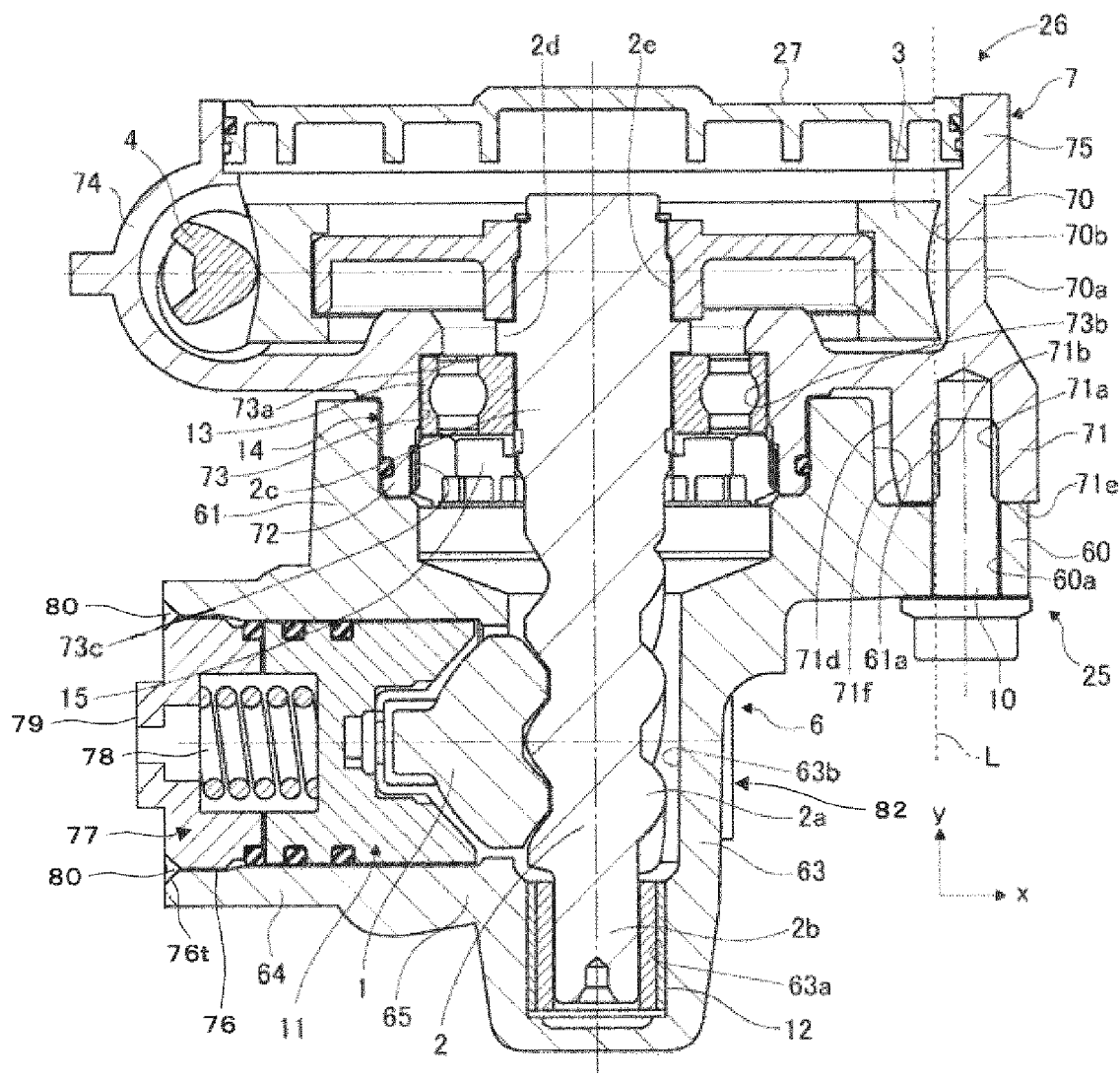
FIG. 2 is a sectional view of an assist mechanism shown in FIG. 1.

FIG. 2 shows a cross section of the power steering mechanism 26 which is taken in the axial direction of the second pinion shaft 2. In addition, due to explanation, an x-axis and a y-axis (shown in FIG. 2) are set in FIG. 2. In FIG. 2, the direction in which the rack retainer 11 urges the rack bar 1 is referred to as an x-axis direction, and the direction on the second pinion shaft 2 side is referred to as positive. In addition, the axial direction of the second pinion shaft 2 is referred to as a y-axis direction, and the direction on the pinion tooth 2a side is referred to as negative.

A pinion tooth 2a is formed on the y-axis negative direction side of the second pinion shaft 2. The distal end on the y-axis negative direction side of the second pinion shaft 2 is formed with a first bearing insertion part 2b having a diameter smaller than the outer diameter of the pinion tooth 2a. A second bearing press-fitting part 2c having a diameter larger than the outer diameter of the pinion tooth 2a is formed more on the y-axis positive direction side than the pinion tooth 2a of the second pinion shaft 2.

A flange part 2d having a diameter larger than the second bearing press-fitting part 2c of the second pinion shaft 2 is formed more on the y-axis positive direction side than the second bearing press-fitting part 2c. A worm wheel fitting part 2e having a diameter smaller than the flange part 2d of the second pinion shaft 2 is formed more on the y-axis positive direction side than the flange part 2d.

The second housing 7 has a hollow shape, and is formed with a worm wheel accommodation part 70 in the vicinity of the middle part in the y-axis direction. The inner periphery of the worm wheel accommodation part 70 is formed so as to have a diameter larger than the worm wheel 3. A worm shaft accommodation part 74 is formed in the direction vertical to the axial direction of the worm wheel accommodation part 70. The inner periphery of the worm shaft accommodation part 74 is formed so as to have a diameter larger than the worm shaft 4.

A lid member fitting part 75 is formed more on the y-axis positive direction side than the worm wheel accommodation part 70. The lid member fitting part 75 is formed so as to have a diameter larger than the worm wheel accommodation part 70. A second bearing holding part 73 is formed more on the y-axis negative direction side than the worm wheel accommodation part 70. The second bearing holding part 73 is disposed with a second bearing 13. That is, the second bearing 13 is disposed at a position close to the worm wheel 3.

The opening part on the worm wheel accommodation part 70 side of the second bearing holding part 73 is formed to have a size substantially similar to that of the inner periphery of the outer race of the second bearing 13, and its surface on the y-axis negative direction side forms a second bearing holding part bottom surface 73a. Surface treatment is conducted to the inner peripheral surface of the second bearing holding part 73 by machining so as to form a second bearing holding part inner peripheral surface 73b. A locking ring fitting part 73c is formed on the negative side in the axial direction of the second bearing holding part 73.

The most part of the second bearing holding part 73 is formed on the inner peripheral side of a part protruding in the y-axis negative direction with respect to the worm wheel accommodation part 70, and the outer periphery of this protruding part forms a second cylindrical engagement part 72. That is, the second cylindrical engagement part 72 is formed so as to protrude toward the first housing 6 side.

A second bolt boss 71 is formed on the outer side in the radial direction of the second bearing holding part 73 at each of three places in the circumferential direction so as to surround the second bearing holding part 73. Each of the second bolt bosses 71 is formed so as to independently protrude toward the y-axis negative direction side. That is, each of the second bolt bosses 71 is formed so as to protrude toward the first housing 6 side. Each of the second bolt bosses 71 is formed with a female screw part 71a opened toward the y-axis negative direction.

The deepest part of the female screw part 71a is formed so as to be located at a position more on the y-axis negative direction side than the worm wheel accommodation part 70. In addition, a female screw innermost part 71b (a position shown by a dot line L in FIG. 2) positioned on the innermost side in the radial direction of the worm wheel accommodation part 70 in the inner peripheral surface of the female screw part 71a is formed more on the radially inner side than an inner peripheral surface 70b of the worm wheel accommodation part 70 in the second housing 7.

In other words, the female screw innermost part 71b (a position shown by the dot line L in FIG. 2) of the female screw part 71a is formed at a position more on the radially inner side than an outer peripheral surface 70a of the worm wheel accommodation part 70 in the second housing 7.

A radially inner-side side surface 71d of each of the second bolt bosses 71 is formed in a shape along the curved surface of a radially outer-side side surface 61a of the after-mentioned first cylindrical engagement part 61. That is, the radially inner-side side surface 71d of each of the second bolt bosses 71 is formed in a curved surface shape having the same center position as that of the radially outer-side side surface 61a of the first cylindrical engagement part 61.

In addition, the radially inner-side side surface 71d includes a taper part 71f, and the diameter of the tapered part 71f becomes smaller (obliquely outward in the radial direction) as it goes to the y-axis negative direction side. In addition, the surface on the y-axis negative direction side of each of the second bolt bosses 71, namely, a facing surface 71e facing the after-mentioned first bolt boss 60 of the first housing 6 is formed so as to be parallel to the second bearing holding part bottom surface 73a of the second bearing holding part 73.

The first housing 6 includes a hollow pinion shaft accommodation part 63 formed in a cup shape having an opening part on the y-axis positive direction side and a bottom part on the y-axis negative direction side, and the bottom part is formed with a first bearing holding part 63a. A pinion tooth accommodation part 63b having a diameter larger than the first bearing holding part 63a is formed more on the y-axis positive direction side than the first bearing holding part 63a. The pinion tooth accommodation part 63b is formed so as to be larger than the outer diameter of the pinion tooth 2a.

A rack bar accommodation part 65 formed extending in the twist direction with respect to the axial direction of the pinion shaft accommodation part 63 is provided on the x-axis negative direction side of the pinion shaft accommodation part 63. When viewed from the x-axis positive direction, in the vicinity of the area where the axial direction of the pinion shaft accommodation part 63 crosses the axial direction of the rack bar accommodation part 65, the pinion shaft accommodation part 63 and the rack bar accommodation part 65 are communicated.

A first bolt boss 60 is formed on the radially outer peripheral side and more on the y-axis positive direction side than the pinion tooth accommodation part 63b. The first bolt boss 60 is circumferentially arranged with the axis of the pinion shaft accommodation part 63 as a center, and is formed at each of three places so as to face the second bolt boss 71. One of the three bolt bosses 60 is arranged between the rack bar accommodation part 65 and a rack retainer accommodation part 64.

A first cylindrical engagement part 61 is formed more on the y-axis positive direction side than the pinion shaft accommodation part 63. That is, the first cylindrical engagement part 61 is formed so as to protrude toward the second housing 7 side. The first cylindrical engagement part 61 is formed in an annular shape protruding from the pinion shaft accommodation part 63, and the inner periphery of the first cylindrical engagement part 61 is formed so as to be slightly larger than the outer diameter of the second cylindrical engagement part 72, and the outer diameter of the first cylindrical engagement part 61 is formed so as to be smaller than the diameter of a circle joining the radially inner-side side surfaces 71d of the second bolt bosses 71.

The second bearing 13 is inserted into the second bearing holding part 73 from the y-axis negative direction side of the second housing 7. At this time, the outer race of the second bearing holding part 73 comes in contact with the second bearing holding part bottom surface 73a. A locking ring 15 is fitted to the locking ring fitting part 73c. The locking ring 15 comes in contact with the outer race of the second bearing 13 in a state of being fitted, and the second bearing 13 is held between the second bearing holding part bottom surface 73a and the locking ring 15.

The worm wheel 3 is formed with, at the center thereof, a through hole, and a worm wheel fitting part 2e of the second pinion shaft 2 is press-fitted into this through hole. In a state in which the worm wheel 3 is assembled to the second bearing 13, the second pinion shaft 2 is inserted into the second bearing 13 assembled to the second housing 7 from the distal end on the y-axis negative direction side of the second bearing 13.

In addition, in a state in which the flange part 2d of the second pinion shaft 2 comes in contact with the inner race of the second bearing 13, the worm wheel 3 is accommodated in the worm wheel accommodation part 70 of the second housing 7.

In addition, the worm shaft 4 is inserted into the worm shaft accommodation part 74 of the second housing 7, and meshes with the worm wheel 3. A lid member 27 is fitted to the lid member fitting part 75 so as to close the opening part on the y-axis positive direction side of the second housing 7.

The first bearing 12 is press-fitted to the first bearing holding part 63a from the y-axis positive direction side of the first housing 6. The second pinion shaft 2 is inserted into the pinion shaft accommodation part 63 of the first housing 6, in a state of being assembled to the second housing 7. At this time, the outer periphery of the second cylindrical engagement part 72 of the second housing 7 is fitted to the inner periphery of the first cylindrical engagement part 61 of the first housing 6. By the first cylindrical engagement part 61 and the second cylindrical engagement part 72, a spigot joint part 14 is formed.

This spigot joint part 14 is arranged so as to overlap with the female screw part 71a of each of the second bolt bosses 71 in the y-axis direction. The first bearing insertion part 2b of the second pinion shaft 2 is inserted into the first bearing 12, and, at this time, the pinion tooth 2a is accommodated in the pinion tooth accommodation part 63b.

In addition, the rack bar 1 is accommodated in the rack bar accommodation part 65 of the first hosing 6, and meshes with the pinion tooth 2a. The rack retainer 11 is accommodated in the rack retainer accommodation part 64, and by the rack retainer 11, the rack bar 1 is pressed to the second pinion shaft 2 side. The bolt 10 is inserted into the through hole of the first bolt boss 60, and is screwed with the female screw part 71a of the second housing 7. With this, the first housing 6 and the second housing 7 are fastened to each other.

The rack retainer accommodation part 64 accommodates the rack retainer 11 accommodated in the space formed by a cylindrical part 76 inside the rack retainer accommodation part 64, an adjust screw 77 provided in the space of the cylindrical part 76, and a compression spring (urging member) 78 accommodated in the space of the rack retainer accommodation part 64 so as to be arranged between the rack retainer 11 and the adjust screw 77. The adjust screw 77 includes an adjust screw main body part and a male screw part provided on the outer peripheral side of the adjust screw main body part so as to be screwed with a female screw part formed on the inner peripheral side of the cylindrical part 76.

The rack retainer 11 is slidable in the space of the cylindrical part 76, and is pressed to the rack bar 1 by the compression spring 78. The urging force of the compression spring 78 is adjusted by the screwing-in amount of the adjust screw 77, and with this, a set load can be set within a range of a predetermined set load. The screwing-in amount is adjusted by a hexagonal adjusting head part 79 formed at the end portion on the opposite side of the compression spring 78 of the adjust screw 77.

In addition, the cylindrical part 76 forming the rack retainer accommodation part 64 includes a female screw part formed on the inner peripheral side of the cylindrical part 76, and a taper part (guide taper part) 76t provided at the inner peripheral edge portion of the cylindrical part 76 in the outer side end portion away from the rack retainer accommodation part 64 of a pair of the end portions of the cylindrical part 76. The taper part 76t is formed such that the outer diameter becomes larger as it goes away from the rack retainer 11.

With this, the taper part 76t has a shape for guiding the after-mentioned caulking punch to a joint of the female screw part of the cylindrical part 76 and the male screw part of the adjust screw 77, and thereby caulking can be easily carried out. Then, by caulking work, a caulking region (plastic deformation region) 80 formed by the caulking is formed at the joint of the female screw part of the cylindrical part 76 and the male screw part of the adjust screw 77. In addition, in the following explanation, the caulking region 80 is referred to as a plastic deformation region 80.

Next, a method for assembling a steering device that is the present embodiment will be explained. The steering device is assembled by carrying out a "pinion shaft assembly step", a "rack bar assembly step", a "rack retainer assembly step", an "urging member assembly step", an "adjust screw screwing-in step", a "caulking step" and a "set load adjusting step".

In addition, an assembled steering device is shown in FIG. 2, and, in the following, while referring to this steering device, the assembly step will be explained. Here, in particular, the feature of the present embodiment is the "caulking step" and the "set load adjusting step", and the other steps will be briefly explained.

In addition, although the "pinion shaft assembly step", the "rack bar assembly step", the "rack retainer assembly step" and the "urging member assembly step" are basically carried out in the following order, if the assembly can be carried out, the order of the assembly steps is not limited to the above order, and the assembly steps can be carried out in any order.

[Pinion Shaft Assembly Step]

First, in the "pinion shaft assembly step", the pinion shaft 2 assembled to the first housing 6 is assembled to the pinion shaft accommodation part 63 formed in the first housing 6. After this, the "rack bar assembly step" is carried out.

[Rack Bar Assembly Step]

Next, in the "rack bar assembly step", the rack bar 1 is assembled to the rack bar accommodation part 65 so as to mesh with the pinion tooth 2a of the pinion shaft 2. After this, the "rack retainer assembly step" is carried out.

[Rack Retainer Assembly Step]

Next, in the "rack retainer assembly step", the rack retainer 11 is assembled to the cylindrical part 76 of the rack retainer accommodation part 64. The rack retainer 11 is assembled so as to sandwich the rack bar 1 by the pinion shaft 2 and the rack retainer 11. After this, the "urging member assembly step" is carried out.

[Urging Member Assembly Step]

Next, in the "urging member assembly step", the compression spring 78 that is an urging member is assembled to the cylindrical part 76 of the rack retainer accommodation part 64. The compression spring 78 is assembled on the opposite side of the rack bar 1 to the rack retainer 11, and with this, it is possible to apply a predetermined urging force (set load) to the rack bar 1 from the rack retainer 11. After this, the "adjust screw screwing-in step" is carried out.

[Adjust Screw Screwing-In Step]

Next, in the "adjust screw screwing-in step", the male screw part of the adjust screw 77 is screwed to the female screw part of the cylindrical part 76 of the rack retainer accommodation part 64. With this, the compression spring 78 is held between the adjust screw 77 and the rack retainer 11.

Then, by screwing in the adjust screw 77, the compression spring 78 is compressed.

In the present embodiment, the adjust screw 77 is screwed in until the end portion on the rack retainer 11 side of the adjust screw 77 comes in contact with the end portion on the adjust screw 77 side of the rack retainer 11. With this, in a state in which the maximum urging force is generated, the after-mentioned caulking work is carried out.

Figure 3:
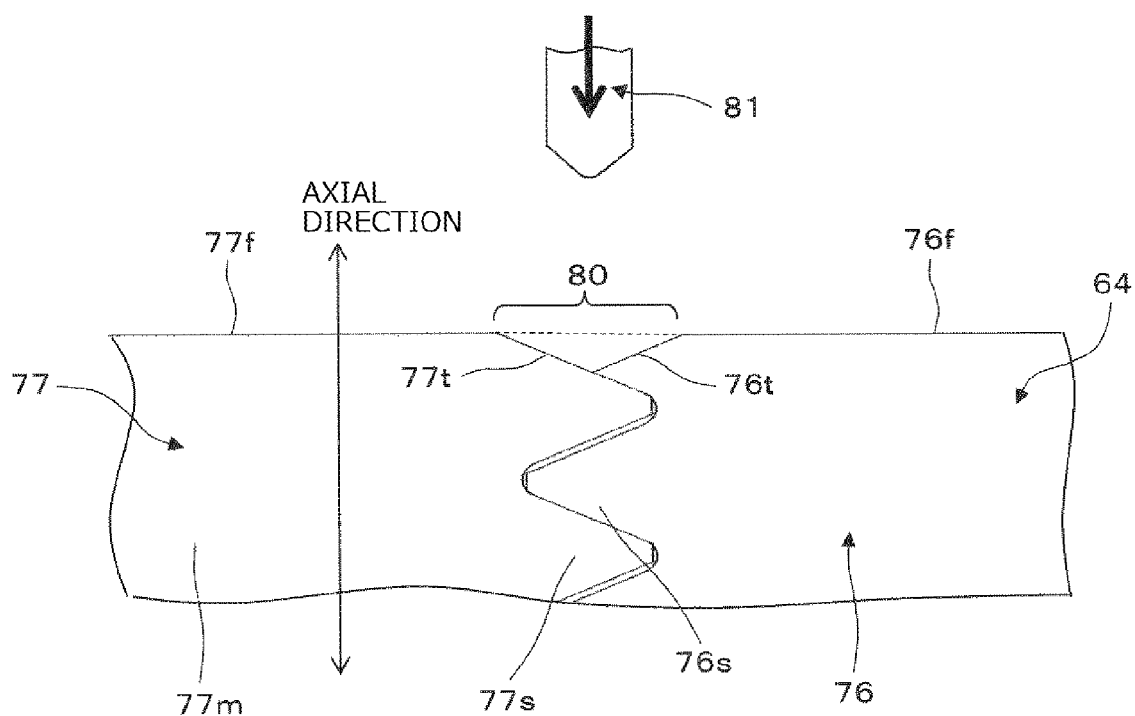
FIG. 3 is an illustrative view for explaining caulking work of an adjust screw and a cylindrical part of a rack retainer accommodation part.

Moreover, as shown in FIG. 3, in a state in which the adjust screw 77 is screwed in until the end portion on the adjust screw 77 side of the rack retainer 11 comes in contact with the adjust screw 77, it is set such that the end portion of the adjust screw 77 on the opposite side of the rack retainer 11 and the end portion of the cylindrical part 76 of the rack retainer accommodation part 64 are flush with one another. With this, the after-mentioned caulking work can be easily carried out.

If the end portion of the adjust screw 77 and the end portion of the cylindrical part 76 of the rack retainer accommodation part 64 are not flush with one another, a caulking punch 81 cannot be efficiently driven, and there is a possibility that a failure in caulking occurs. After the "adjust screw screwing-in step", the "caulking step" is carried out.

[Caulking Step]

Next, the "caulking step" is carried out after the "adjust screw screwing-in step", and the rack retainer accommodation part 64 and the adjust screw 77 are caulked and fixed such that the plastic deformation region formed by the caulking straddles both of the female screw part formed to the cylindrical part 76 of the rack retainer accommodation part 64 and the male screw part of the adjust screw 77.

The caulking fixing force by this caulking work is set to a value at which the adjust screw 77 is not loosened in a normal use state of being mounted on a vehicle and when a predetermined rotation force is applied to the adjust screw 77, it can be loosened, in order to carry out the after-mentioned "set load adjusting step". In addition, this caulking fixing force can be obtained by a method such as simulation, or can be experimentally obtained, and it can be obtained by an appropriate manner.

As shown in FIG. 3, a chisel or the calking punch 81 can be used for the caulking work. FIG. 3 shows a cross section in the vicinity of the joint of the plastic deformation region 80 where the caulking of a female screw part 76s of the cylindrical part 76 of the rack retainer accommodation part 64 and a male screw part 77s of the adjust screw 77 is carried out.

Figure 4:
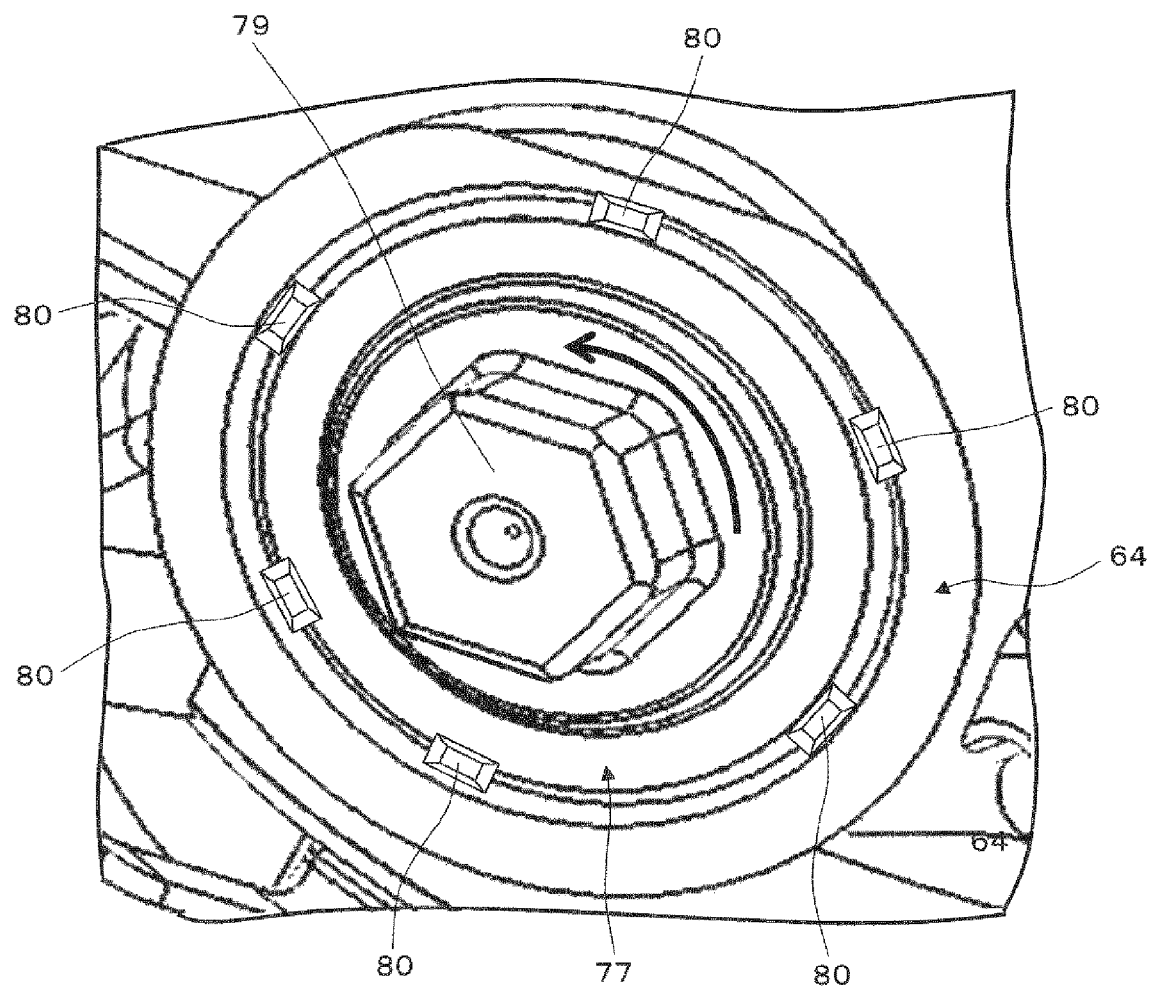
FIG. 4 is a perspective view of the external appearance near the adjust screw of the assist mechanism in FIG. 2.

As shown in FIG. 3 and FIG. 4, a plane part 76f of the cylindrical part 76 and a plane part 77f of the adjust screw 77 in the plastic deformation region 80 where the caulking is carried out are located at the substantially same position when viewed in the axial direction. That is, when the caulking work is carried out, they are substantially flush with one another. In addition, inclined guide taper parts 76t, 77t are respectively formed at the screwed joints of the plane part 76f of the cylindrical part 76 and the plane part 77f of the adjust screw 77. Here, plastic deformation regions 80 shown in FIG. 4 are exaggeratedly drawn, and actually, they are therefore smaller than those shown in FIG. 4. In addition, the caulking work is carried out in a state in which the distal end of a chisel or the calking punch 81 comes in contact with both of the female screw part 76s and the male screw part 77s.

The guide taper parts 76t, 77t cross each other so as to form a recessed shape (valley shape), and the caulking punch 81 can be easily guided. The cross section of the caulking punch 81 has a conical shape, and thereby the top part straddling both of the female screw part 76s formed to the cylindrical part 76 and the male screw part 77s of the adjust screw 77 can be efficiently caulked.

In this case, since, in the "adjust screw screwing-in step", the adjust screw 77 is screwed in until the end portion of the adjust screw 77 comes in contact with the end portion of the rack retainer 11 as mentioned above, when the caulking punch 81 is driven, the adjust screw 77 is received by the rack retainer 11, and the driving load of the caulking punch 81 can be effectively applied to the female screw part 76s formed to the cylindrical part 76 and the male screw part 77s of the adjust screw 77. After this, the "set load adjusting step" is carried out.

[Set Load Adjusting Step]

Next, the "set load adjusting step" is carried out after the "caulking step", and in the "set load adjusting step", a set load that is the force by which the rack retainer 11 urges the rack bar 1 is adjusted. This load adjustment is one in which the adjust screw 77 is loosened in the direction of an arrow shown in FIG. 4 so as to reduce the screwing-in amount of the adjust screw 77 to a point where the set load falls within a predetermined set load range.

In addition, as mentioned above, the caulking fixing force in the "caulking step" is set to a loosening value at which the adjust screw 77 is not loosened in a normal use state of being mounted on a vehicle and when a predetermined rotation force is applied to the adjust screw 77, it can be loosened. Accordingly, the adjustment of the set load by the adjust screw 77 can be carried out by applying a rotation force higher than the loosening value to the adjusting head part 79 of the adjust screw 77.

In addition, after the "set load adjusting step", since the adjust screw 77 is loosened, the plastic deformation region 80 formed so as to straddle the adjust screw 77 side and the rack retainer accommodation part 64 is separated and shifted in the circumferential direction, and when this shifting is checked, it is possible to confirm that the "set load adjusting step" have been carried out after the "caulking step". Therefore, it is possible to surely confirm, by visual inspection, whether or not the "set load adjusting step" have been carried out.

In this way, by the "caulking step", the region straddling the female screw part 76s of the cylindrical part 76 and the male screw part 77s of the adjust screw 77 is plastically deformed, and the backlash between the cylindrical part 76 and the adjust screw 77 is reduced.

Then, since the "set load adjusting step" is carried out after the "caulking step", it is possible to suppress fluctuations in the set load due to fluctuations in the screwing-in amount of the adjust screw 77 after the "set load adjusting step", as in conventional one.

In addition, after the "set load adjusting step", the caulking step is not carried out again, and thereby it is possible to suppress fluctuations in the set load associated with the impact of the caulking work by the "caulking step" after the "set load adjusting step".

Moreover, since the "caulking step" is carried out such that the region (plastic deformation region) straddling both of the female screw part 76s and the male screw part 77s is plastically deformed, in the plastic deformation region 80, the fixing strength between the female screw part 76s and the male screw part 77s can be improved, and thereby fluctuations in the set load after the set load adjustment can be suppressed.

Next, based on the embodiment mentioned above, a further advantage of the embodiment will be explained.

As shown in FIG. 2 and FIG. 3, the adjust screw 77 is equipped with the plane part 77f provided in a predetermined range including a main body part outer side end portion away from the rack retainer 11 of the end portions of the adjust screw main body part 77m. This plane part 77f is provided more on the inner side than the male screw part 77s in the radial direction to the rotation axial line of the adjust screw 77, and is formed parallel to the plane orthogonal to the rotation axial line of the adjust screw 77. Then, after the "set load adjusting step", the adjust screw 77 protrudes more on the outer side than the cylindrical part 76.

That is, a part of the plane part 77f of the adjust screw 77 which is located closest to the male screw part 77s in the radial direction to the rotation axial line of the adjust screw 77 protrudes more on the opposite side of the rack retainer 11 in the direction of the rotation axial line of the adjust screw 77 than a part of the outer side end part of the cylindrical part 76 which is located adjacent to the taper part 76t in the radial direction to the rotation axial line of the adjust screw 77.

After the "set load adjusting step", the plane part 77f of the adjust screw 77 protrudes more on the outer side than the part adjacent to the taper part 76t formed in the cylindrical part 76. In the "set load adjusting step", since the adjust screw 77 is loosened in the direction in which the screwing-in amount decreases, before the "set load adjusting step", in other words, at the time of the "caulking step", the difference in the protruding amount between the plane part 77f and the part adjacent to the taper part 76t is small. Consequently, at the time of the "caulking step", one of the plane part 77f and the part adjacent to the taper part 76t does not excessively protrudes, and the caulking work becomes easy.

In addition, as mentioned above, in the "adjust screw screwing-in step", the adjust screw 77 is screwed into the cylindrical part 76 until a main body part inner side end portion close to the rack retainer 11 of the end portions of the adjust screw main body part 77m comes in contact with the rack retainer 11.

By screwing in the adjust screw 77 until the adjust screw 77 comes in contact with the rack retainer 11, the plastic deformation of the male screw part 77s of the adjust screw 77 and the female screw part 76s of the cylindrical part 76 starts, and the female screw part 76s comes in contact with the male screw part 77s easily in a large area. In other words, the gap between the female screw part 76s and the male screw part 77s decreases, and by carrying out the caulking and fixing in this state, the fixing strength between the female screw part 76s and the male screw part 77s can be improved by the caulking and fixing.

In addition, in the "caulking step", in a part of the female screw part 76s or a part of the male screw part 77s which is exposed on the opposite side of the rack retainer 11 in the direction of the rotation axial line of the adjust screw 77, an area including the top of the female screw part 76s or the top of the male screw part 77s is caulked and fixed.

By caulking and fixing the distal end portion (top) of a screw thread, the screw thread is plastically deformed easily, and the plastic deformation amount of the screw thread can be large. With this, in the "set load adjusting step", a part where plastic deformation is small is superimposed on a part where plastic deformation is large in the screw thread, and a displacement amount at the time of the plastic deformation can be large. As a result of this, by the plastic deformation, a force by which the female screw part 76s and the male screw part 77s are pressed to each other becomes large, and the fixing strength of the adjust screw 77 to the cylindrical part 76 can be improved.

Figure 5:
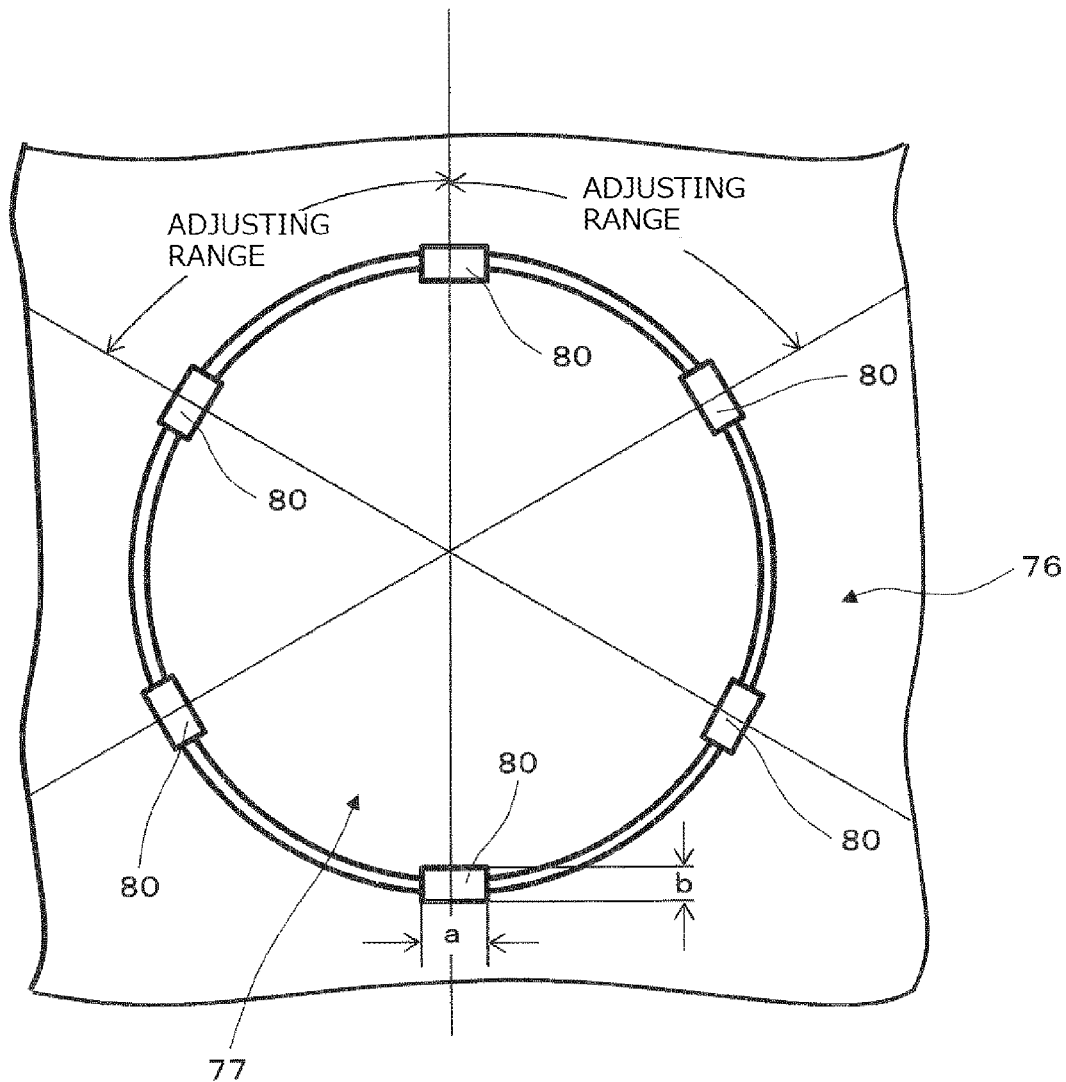
FIG. 5 is an illustrative view for explaining the relation between the adjust screw and a caulking region.

In addition, as shown in FIG. 5, in plastic deformation regions 80 in the "caulking step" at a plurality of places in the circumferential direction with the rotation axial line of the adjust screw 77 as a center, the cylindrical part 76 and the adjust screw 77 are caulked and fixed. In the present embodiment, six plastic deformation regions 80 are formed every 60°.

In this way, by providing a plurality of the plastic deformation regions 80, the fixing strength by the caulking and fixing can be improved. Moreover, by adjusting the number of the plastic deformation regions 80, it is possible to adjust the value of the caulking fixing force or the value of the loosening of the adjust screw 77 mentioned above.

In addition, as show in FIG. 5, the plastic deformation regions 80 include at least a first plastic deformation region 80 and a second plastic deformation region 80 adjacent to each other in the circumferential direction with the rotation axial line of the adjust screw 77 as a center, and, in the "set load adjusting step", the adjust screw 77 can be loosened within a range (as shown in an adjusting range) in which the first plastic deformation region 80 does not overlap with the second plastic deformation region 80 when the plastic deformation regions 80 are viewed in the rotation axial line of the adjust screw 77.

In case where the adjust screw 77 is loosened until plastic deformation regions circumferentially adjacent to each other, such as the first plastic deformation region 80 and the second plastic deformation region 80, overlap with each other, a force by which the female screw part 76s and the male screw part 77s are pressed to each other in the plastic deformation regions 80 decreases. Therefore, in the "set load adjusting step", by carrying out the "set load adjusting step" within a range in which plastic deformation regions 80 circumferentially adjacent to each other do not overlap with each other, the lowering of the fixing strength of the adjust screw 77 can be suppressed.

In addition, in the "caulking step", the first plastic deformation region 80 and the second plastic deformation region 80 provided at a plurality of places in the circumferential direction with the rotation axial line of the adjust screw 77 as a center are formed by separate caulking steps.

All of the plastic deformation regions 80 provided at a plurality of places are not caulked and fixed at a time but are caulked and fixed by dividing it into a plurality of times, and thereby, as compared with a case where the caulking and fixing are carried out at a time, a caulking load can be reduced, and the occurrence of the deformation or damage of the gear housing caused by the caulking and fixing can be suppressed.

In addition, in the "caulking step", in the circumferential direction with the rotation axial line of the adjust screw 77 as a center, of plastic deformation regions 80 provided at a plurality of places, plastic deformation regions 80 located at symmetrical positions with the rotation axial line of the adjust screw 77 as a center are caulked and fixed successively.

With this, when the adjust screw 77 is inclined caused by the caulking work in one plastic deformation region 80, by carrying out the caulking and fixing of the other plastic deformation region 80 on the opposite side, the inclination of the adjust screw 77 can be corrected.

In addition, the cross section in the axial line direction of the caulking punch 81 has a conical shape, and the shape of the plastic deformation in the plastic deformation region 80 is a conical shape along the shape of the cross section in the axial line direction of the caulking punch 81.

With this, since the shape of the plastic deformation of the plastic deformation region 80, namely, the shape of the caulking punch 81 is a conical shape having a thin distal end portion, a plastic deformation load is easily applied to the plastic deformation region 80, and the plastic deformation region 80 can be formed with a relatively small load. Consequently, the occurrence of the deformation of other parts caused by the "caulking step" can be suppressed.

In addition, as shown in FIG. 5, the shape of the plastic deformation in the plastic deformation region 80 is formed such that a length (a) in the circumferential direction with the rotation axial line of the adjust screw 77 as a center is longer than a length (b) in the radial direction.

Accordingly, since the circumferential length of the plastic deformation region 80 is relatively long, a range in which a fixing force is exhibited between the female screw part 76s and the male screw part 77s becomes large, and it is possible to suppress fluctuations in a set load after adjusting the set load.

In addition, although the shape the plastic deformation region 80 is formed such that the circumferential length (a) is longer than the radial length (b), the shape of the caulking punch 81 does not need to have the same relation to the shape of the plastic deformation region 80. For example, there is case where the maximum value of the redial dimension of a caulking punch is larger than the maximum value of the circumferential dimension of the caulking punch, and the pushing amount of the punch is small (it is not pushed to the maximum dimension), as a result of which the circumferential dimension of the plastic deformation region become longer.

In addition, as shown in FIG. 3, in the radial direction to the rotation axial line of the adjust screw 77, the cylindrical part 76 is formed with the guide taper part 76t provided on the outer peripheral side of the female screw part 76s. In the direction of the rotation axial line of the adjust screw 77, the guide taper part 76t is formed such that the radius to the rotation axial line of the adjust screw 77 becomes gradually larger as it goes toward the direction away from the rack retainer 11.

Consequently, since the guide taper part 76t is formed so as to guide the caulking punch 81 to the joint between the female screw part 76s of the cylindrical part 76 and the male screw part 77s of the adjust screw 77, the calking work can be easily carried out.

In addition, in the "adjust screw screwing-in step", in a state in which the adjust screw 77 is screwed in until the adjust screw 77 comes in contact with the rack retainer 11, in the direction of the rotation axial line of the adjust screw 77, when viewed from a direction away from the rack retainer 11, the guide taper part 76t is formed so as to be exposed in the whole area in the circumferential direction to the rotation axial line of the adjust screw 77.

With this, since the guide taper part 76t is formed so as to be exposed in the whole circumference, the guide taper part 76t exists in the plastic deformation region 80 at any position, and thereby the caulking work can be carried out easily.

Figure 6:
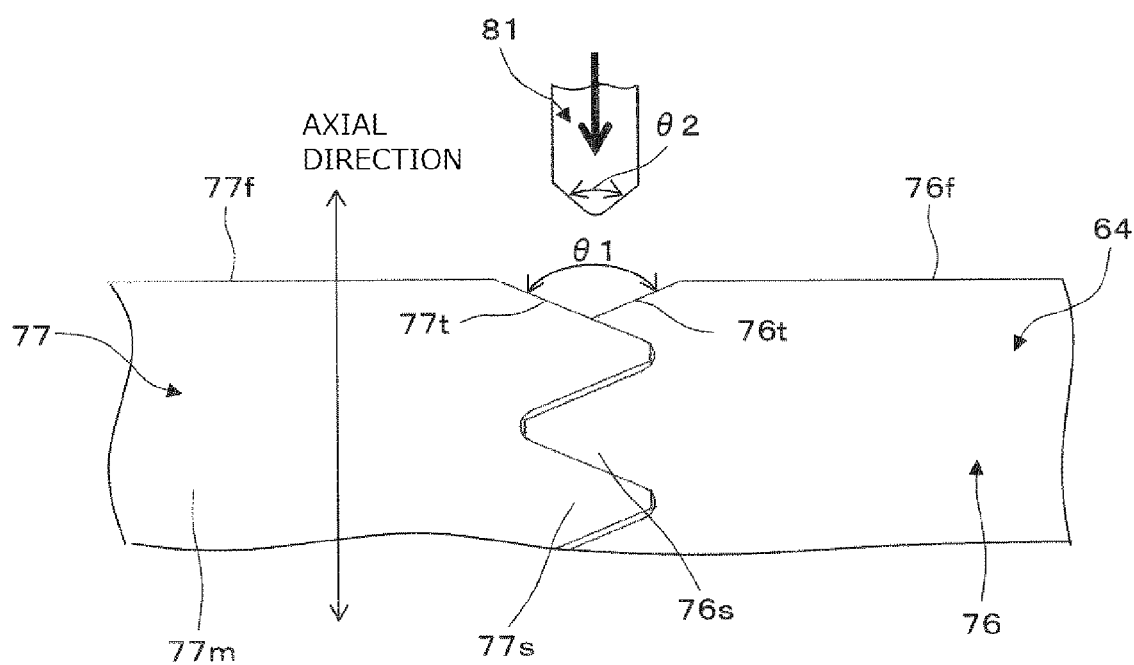
FIG. 6 is an illustrative view for explaining another caulking work of the adjust screw and the cylindrical part of the rack retainer accommodation part.

In addition, as shown in FIG. 6, a minor angle ($\theta 1$) of angles made by being sandwiched between the guide taper part 76t and the male screw part 77s of the adjust screw 77 in the cross section passing through the rotation axial line of the adjust screw is made to be larger than a distal end angle ($\theta 2$) of the caulking punch 81 for carrying out the "caulking step".

With this, since the relation of "punch distal end angle ($\theta 2$)<angle ($\theta 1$) sandwiched between the guide taper part and the male screw part" is made, the distal end portion of the caulking punch 81 can reach near the deep part of the guide taper part 76t (joint between the female screw part 76s and the male screw part 77s).

In addition, the yield point at which the adjust screw 77 exceeds its elastic limit is set to be larger than the yield point of the cylindrical part 76. Consequently, in the "set load adjusting step", the elastic region of the male screw part 77s of the adjust screw 77 can be used, and a sufficient pressing force from the male screw part 77s toward the female screw part 76s of the cylindrical part 76 can be obtained.

In addition, the adjust screw 77 is made of the same material of that of the cylindrical part 76. With this, since the linear expansion coefficient of the adjust screw 77 is close to (the same as) that of the cylindrical part 76, the loosening of the adjust screw 77 caused by temperature change can be suppressed.

In addition, the adjust screw 77 is made of the same material of that of the cylindrical part 76. Moreover, the adjust screw 77 is heat-treated such that the yield point of the adjust screw 77 becomes larger than that of the cylindrical part 76.

Consequently, since the linear expansion coefficient of the adjust screw 77 is close to (the same as) that of the cylindrical part 76, the loosening of the adjust screw 77 caused by temperature change can be suppressed, and, since the elastic region of the male screw part 77s of the adjust screw 77 can be used, a sufficient pressing force from the male screw part 77s toward the female screw part 76s of the cylindrical part 76 can be obtained.

In addition, as shown in FIG. 2, a caulking reaction force receiving part 82 is formed on the opposite side of the rack retainer accommodation part 64 of the first housing 6. In the direction of the rotation axial line of the adjust screw 77, the caulking reaction force receiving part 82 is a plane part provided on the opposite side of the plastic deformation region 80 with the rack retainer accommodation part 64 therebetween.

With this, in the caulking work, by arranging a gear housing onto a workbench such that the caulking reaction force receiving part 82 comes in contact with the upper surface of the workbench, the gear house is stabilized, and the caulking work can be carried out easily.

As mentioned above, in the present invention, after the adjust screw is screwed in, the rack retainer accommodation part and the adjust screw are caulked and fixed such that the plastic deformation region by the caulking straddles both of the female screw part of the rack retainer accommodation part and the male screw part of the adjust screw, and the adjust screw is loosened so as to reduce the screwing-in amount of the adjust screw to a point where the set load, which is a force by which the rack retainer urges the rack bar, falls within a predetermined range, thereby adjusting the urging force.

Consequently, after the set load adjusting step, the caulking step is not carried out again, and it is possible to suppress fluctuations in the set load associated with the impact of the caulking step after the set load adjusting step.

The present invention is not limited to the above-mentioned embodiment, and various variations are included. For example, the above-mentioned embodiment is one for clearly explaining the present invention, and it is not always limited to one provided with all of the configurations mentioned above. In addition, part of the configuration of one embodiment can be replaced to the configuration of the other embodiment, or the configuration of one embodiment can be added to the configuration of the other embodiment. In addition, in part of the configuration of each embodiment, removing or addition and replacement of another configuration can be performed.

EXPLANATION OF SIGNS

1: rack bar, 2: second pinion shaft (pinion shaft), 3: worm wheel, 4: worm shaft, 5: electric motor, 6: first housing, 7: second housing, 10: bolt, 11: rack retainer, 12: first bearing, 13: second bearing, 14: spigot joint part, 60: first bolt boss, 61: first cylindrical engagement part, 63: pinion shaft accommodation part, 64: rack retainer accommodation part, 65: rack bar accommodation part, 70: worm wheel accommodation part, 71: second bolt boss, 72: second cylindrical engagement part, 73: second bearing holding part, 76: cylindrical part, 76t: guide taper part, 76s: female screw part, 76f: plane part, 77: adjust screw, 77t: guide taper part, 77s: male screw part, 77f: plane part, 77m: adjust screw main body part, 78: compression spring (urging member), 79: adjusting head part, 80: plastic deformation region, 81: caulking punch, 100: electric power steering device.

The invention claimed is:

1. A method for manufacturing a steering device provided with: a gear housing including a pinion shaft accommodation part, a rack bar accommodation part and a rack retainer accommodation part; a pinion shaft which is accommodated in the pinion shaft accommodation part, has a pinion tooth, and rotates integrally with a rack bar; the rack bar which rotates with a rotation of a steering wheel, is accommodated in the rack bar accommodation part, and has a rack tooth meshing with the pinion tooth; a rack retainer accommodated in the rack retainer accommodation part; an adjust screw provided in the rack retainer accommodation part; and an urging member accommodated in the rack retainer accommodation part so as to be arranged between the rack retainer and the adjust screw, wherein the rack retainer accommodation part includes a cylindrical part, a female screw part formed on an inner peripheral side of the cylindrical part and a taper part provided at an inner peripheral edge portion of the cylindrical part of an outer side end portion of a pair of end portions of the cylindrical part, the outer side end portion being located away from the rack bar accommodation part, and wherein the adjust screw includes an adjust screw main body part and a male screw part provided on an outer peripheral side of the adjust screw main body part and screwed with the female screw part, the method comprising:

a pinion shaft assembly step of assembling the pinion shaft to the pinion shaft accommodation part;

a rack bar assembly step of assembling the rack bar to the rack bar accommodation part;

a rack retainer assembly step of assembling the rack retainer to the rack retainer accommodation part, the rack retainer being provided such that the rack bar is interposed between the pinion shaft and the rack retainer;

an urging member assembly step of assembling the urging member to the rack retainer accommodation part so as to be positioned on an opposite side of the rack bar with respect to the rack retainer;

an adjust screw screwing-in step of screwing in the adjust screw to the rack retainer accommodation part such that the male screw part of the adjust screw is screwed with the female screw part of the rack retainer accommodation part and the urging member is compressed;

a caulking step of caulking and fixing the adjust screw and the rack retainer accommodation part such that a plastic deformation region by caulking straddles both of the female screw part and the male screw part and in a part of the female screw part or a part of the male screw part of the cylindrical part which is exposed on the opposite side of the rack retainer in a direction of a rotation axial line of the adjust screw, an area including a top of the female screw part or a top of the male screw part is caulked and fixed, the caulking step being carried out after the adjust screw screwing-in step; and a set load adjusting step of adjusting a set load, which is a force by which the rack retainer urges the rack bar, by loosening the adjust screw to reduce a screwing-in amount of the adjust screw to a point where the set load falls within a predetermined range, the set load adjusting step being carried out after the caulking step.

2. The method for manufacturing the steering device according to claim 1, wherein the adjust screw is equipped with a plane part provided in a predetermined range including a main body part outer side end portion of a pair of end portions of the adjust screw main body part, the main body part outer side end portion being located away from the rack retainer, wherein the plane part is provided more on an inner side than the male screw part in a radial direction to a rotation axial line of the adjust screw, and is formed parallel to a plane orthogonal to the rotation axial line of the adjust screw, and wherein, after the set load adjusting step, a part of the plane part of the adjust screw which is located closest to the male screw part in the radial direction to the rotation axial line of the adjust screw protrudes more on an opposite side of the rack retainer in a direction of the rotation axial line of the adjust screw than a part of the outer side end portion of the cylindrical part which is located adjacent to the taper part in the radial direction to the rotation axial line of the adjust screw.

3. The method for manufacturing the steering device according to claim 1, wherein, in the adjust screw screwing-in step, the adjust screw is screwed into the rack retainer accommodation part until a main body part inner side end portion close to the rack retainer of a pair of end portions of the adjust screw main body part comes in contact with the rack retainer.

4. The method for manufacturing the steering device according to claim 1, wherein, in the caulking step, the rack retainer accommodation part and the adjust screw are caulked and fixed at a plurality of places in a circumferential direction with a rotation axial line of the adjust screw as a center.

5. The method for manufacturing the steering device according to claim 4, wherein the plastic deformation region includes a first plastic deformation region and a second plastic deformation region adjacent to each other, in the circumferential direction with the rotation axial line of the adjust screw as a center, and wherein, in the set load adjusting step, the adjust screw is loosened within a range in which the first plastic deformation region and the second plastic deformation region do not overlap with each other when the plastic deformation region is viewed in the direction of the rotation axial line of the adjust screw.

6. The method for manufacturing the steering device according to claim 4, wherein, in the caulking step, a first plastic deformation region and a second plastic deformation region provided at a plurality of places in the circumferential direction with the rotation axial line of the adjust screw as a center are formed by separate steps.

7. The method for manufacturing the steering device according to claim 6, wherein, in the caulking step, in the circumferential direction with the rotation axial line of the adjust screw as a center, of plastic deformation regions provided at a plurality of places, plastic deformation regions located at symmetrical positions with the rotation axial line of the adjust screw as a center are caulked and fixed successively.

8. The method for manufacturing the steering device according to claim 1, wherein a shape of a plastic deformation in the plastic deformation region is a conical shape.

9. The method for manufacturing the steering device according to claim 1, wherein a shape of a plastic deformation in the plastic deformation region is formed such that a length in a circumferential direction with a rotation axial line of the adjust screw as a center is longer than a length in a radial direction.

10. The method for manufacturing the steering device according to claim 1, wherein, in a radial direction to a rotation axial line of the adjust screw, the cylindrical part of the rack retainer accommodation part is formed with a guide taper part provided on an outer peripheral side of the female screw part, and wherein, in a direction of the rotation axial line of the adjust screw, the guide taper part is formed such that a radius thereof to the rotation axial line of the adjust screw becomes gradually larger as it goes toward a direction away from the rack retainer.

11. The method for manufacturing the steering device according to claim 10, wherein, in the adjust screw screwing-in step, in a state in which the adjust screw is screwed in until the adjust screw comes in contact with the rack retainer, in the direction of the rotation axial line of the adjust screw, when viewed from a direction away from the rack retainer, the guide taper part is formed so as to be exposed in a whole area in a circumferential direction to the rotation axial line of the adjust screw.

12. The method for manufacturing the steering device according to claim 10, wherein a minor angle of angles made by being sandwiched between the guide taper part and the male screw part in a cross section passing through the rotation axial line of the adjust screw is larger than an angle of a distal end portion of a punch for carrying out the caulking step.

13. The method for manufacturing the steering device according to claim 1, wherein a yield point of the adjust screw is larger than that of the cylindrical part.

14. The method for manufacturing the steering device according to claim 13, wherein a material of the adjust screw is a same as that of the cylindrical part.

15. The method for manufacturing the steering device according to claim 14, wherein the adjust screw is heat-treated such that the yield point of the adjust screw becomes larger than that of the cylindrical part.

16. The method for manufacturing the steering device according to claim 1, wherein the gear housing includes a caulking reaction force receiving part, and wherein, in a direction of a rotation axial line of the adjust screw, the caulking reaction force receiving part is a plane part provided on an opposite side of the plastic deformation region with the rack retainer accommodation part therebetween.

17. The method for manufacturing the steering device according to claim 1, wherein a caulking fixing force in the caulking step is set to a fixing force value at which the adjust screw is not loosened in a normal use state of being mounted on a vehicle and when a predetermined rotation force is applied to the adjust screw, it can be loosened.

\* \* \* \* \*